United States Patent [19]
Kadow
[11] 3,728,552
[45] Apr. 17, 1973

[54] CONTROL DEVICE FOR A SELECTIVE MATRIX OF A DATA MEMORY WITH SELECTIVE ACCESS

[75] Inventor: Hermann Kadow, Vaterstetten, Germany
[73] Assignee: Siemens Aktiengesellschaft, Berlin and Munich, Germany

[22] Filed: Mar. 7, 1972
[21] Appl. No.: 232,423

[30] Foreign Application Priority Data
Mar. 30, 1971 Germany....................P 21 15 453.0

[52] U.S. Cl. ..................307/208, 307/218, 307/232, 307/262
[51] Int. Cl.........................H03k 19/08, H03k 19/22
[58] Field of Search.......................307/208, 218, 203, 307/207, 213, 214, 215, 231, 232, 235, 238, 262; 340/173 AM

[56] References Cited

UNITED STATES PATENTS 3,684,897 8/1972 Anderson et al. ....................307/208

*Primary Examiner*—Stanley D. Miller, Jr.
*Attorney*—Carlton Hill et al.

[57] ABSTRACT

A control device for a selective matrix of a data memory employs RC circuits to simulate the thermal behavior of the selection circuits, a threshold circuit for evaluating a thermal limit which is critical for the selection circuits, a first integrated circuit component designed as a potential converter which forms the input stage of two parallel connected control signal generators and a second integrated component which functions as a double difference comparing circuit, the arrangement being compatible on its input side with ECL techniques and on its output side with TTL techniques.

1 Claim, 1 Drawing Figure

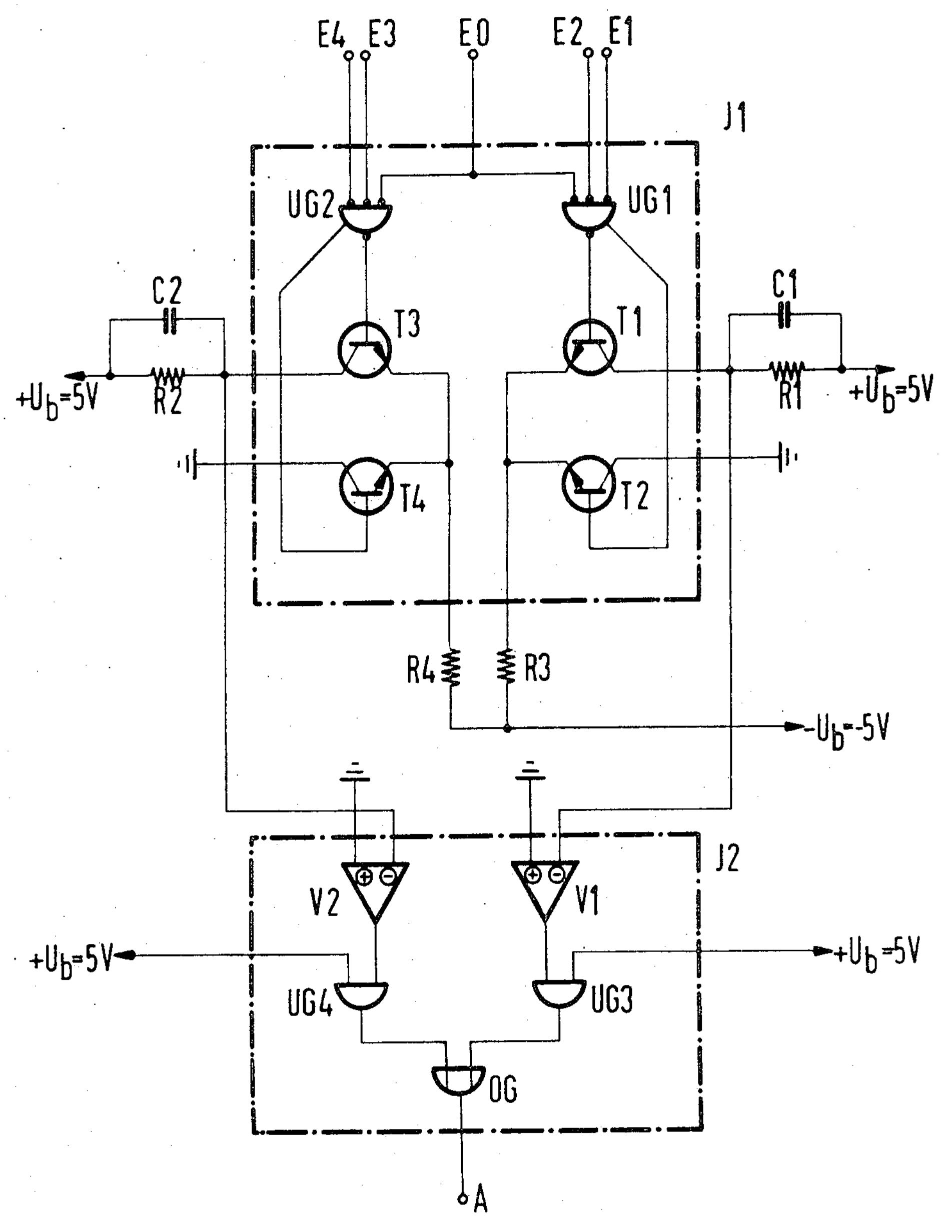
E4
E3
E0
E2
E1
J1
UG2
UG1
C2
C1
T3
T1
+Ub=5V
R2
R1
+Ub=5V
T4
T2
R4
R3
-Ub=-5V
J2
V2
V1
+Ub=5V
+Ub=5V
UG4
UG3
OG
A

CONTROL DEVICE FOR A SELECTIVE MATRIX OF A DATA MEMORY WITH SELECTIVE ACCESS

BACKGROUND OF THE INVENTION

1. Field of the Invention

This invention relates to a control device which is assigned to a selection matrix and dimensioned only for stresses occurring during normal operation of a data memory having selective access and in which, in order to protect the selective circuits, the thermal behavior thereof is simulated with RC circuits and wherein a threshold circuit is provided for evaluating circuit operation with respect to a critical thermal limit.

2. Description of the Prior Art

A selection matrix, such as disclosed in my pending application entitled "Selective Circuit for a Random Access Storage," U. S. Ser. No. 70,752 filed Sept. 9, 1970, which was not heretofore known is not designed according to stress encountered during a continuous operation, but according to that encountered during normal operation where essentially less power losses occur. This dimensioning of the selection circuits takes into account the fact that during the normal operation of a memory with selective access, the desired address continuously changes. Mere interferences or a test operation are exceptions. In such cases, one and the same address can be called continuously during a desired period of time so that one and the same selection circuit is operated and thereby overloaded. Due to this, a control device is assigned to the selection matrix, which device contains control signal generators in which the thermal behavior of the individual selection circuits of the selective matrix is simulated.

In my aforementioned application, a control signal generator is suggested in a further development, which generator is characterized by an AND gate for the logical linkage of an address signal and a timing signal, whose complementary outputs are respectively connected with the bases of two transistors having emitters which are connected to a negative operating potential by way of a common emitter resistor, by means of a timing circuit consisting of a parallel connection of a capacitor and another resistor between the collector of the transistor which is conductive in the operational state and ground potential, and by a threshold circuit consisting of an inverter whose input is connected to an adjustable tap of the resistor of the timing circuit.

The above circuit arrangement performs satisfactorily, but if it is completely constructed of discrete components, the packing density desired in modern data processing devices cannot be obtained.

DESCRIPTION OF THE PREFERRED EMBODIMENT

In view of the foregoing, the object of the present invention is to provide a control signal generator which permits higher packing density in connection with low cost for realization of the circuit arrangement.

Proceeding from the thought that an integration of the aforementioned circuit arrangement, which is usually possible, cannot be accomplished due to the technical expense encountered in production, the foregoing objective is achieved by the use of a first integrated component which is known per se and which is designed as a potential converter and forms the input stage of two parallel connected control signal generators in which two pairs of emitter coupled transistors are connected to complementary outputs of one of two AND gates, respectively, by way of the base connections of the transistors. Further, one of the two emitter resistors, respectively, is arranged as a discrete component element between the pair of coupled emitter connections of the transistors and a negative operating potential. A pair of RC circuits is provided and respective ones of said circuits are connected between the collectors of the transistors which are connected to the negated outputs of the AND gate and a positive operating voltage, while the collector connections of the other transistors are grounded. A second integrated circuit component, which is also known per se, is designed as a double difference comparing device and utilized as an output stage with two input amplifiers which are connected to the two inputs of an OR gate having an output for taking off a control signal, and further via respective AND gates each of which have a separate input connected to a positive operational voltage. One of the inputs of each of the input amplifiers is grounded while the other input of each amplifier is connected to the junction of respective collectors of the transistors of the first integrated component and the associated RC circuits.

A circuit arrangement which is designed according to the present invention has the advantage of essentially fewer discrete component elements when compared with the circuits heretofore known, and the circuit arrangement can be simply realized since it is constructed of component elements which are common on the market. In addition, it is compatible with ECL circuit techniques on the input side and with TTL circuit techniques on the output side. Furthermore, due to the properties of the integrated circuit components, the arrangement has fewer and smaller tolerances than a corresponding circuit arrangement made of discrete component elements.

The invention, its organization construction and operation will best be understood from the following detailed description of a preferred embodiment thereof taken in conjunction with the single FIGURE of the drawing which is a schematic diagram illustration of a circuit arrangement constructed in accordance with the principles of the invention.

In the drawing, two parallel connected control signal generators are illustrated as being logically linked at their output side. The circuit arrangement comprises a first integrated circuit component J1 as an input stage and a second integrated circuit component J2 as an output stage.

The input stage J1 includes ECL compatible decoding and comprises two pairs of emitter coupled transistors T1, T2 and T3, T4, respectively. The base connections of each pair of the emitter coupled transistors T1, T2 or T3, T4 are connected with complementary outputs of a first AND gate UG1 and a second AND gate UG2, respectively. These two AND gates UG1 and UG2 each have three negated inputs. Each one of these inputs is wired internally and extended outwardly toward an external input EO. The other two inputs of each one of the AND gates UG1, UG2 form the external inputs E1, E2 and E3, E4, respectively, of the two control signal generators.

The input EO is an input for receiving a timing signal which essentially has two functions: (1) it determines a certain instant when the control signal generator is to be activated; and (2) it can reproduce or simulate a certain operational state by means of its duration. The two other inputs E1, E2 and E3, E4, respectively, are inputs for receiving selection signals. Since each AND gate UG1, UG2 has more than one input, it can also be utilized to a certain degree as a decoding stage so that decoding networks, which are selected by the individual control signal generators, can be more simply designed.

Two RC circuits R1, C1 and R2, C2 are respectively assigned to each control signal generator of the first integrated circuit component J1. These RC circuits consist of the parallel connection of a resistor R1 and a capacitor C1, and a resistor R2 and a capacitor C2. The RC circuits are respectively arranged between a positive operational voltage $+U_b = +5\,V$ and the collector of the transistors T1 and T3, respectively, which are connected to the negated outputs of the AND gates UG1 and UG2, respectively. The collectors of the two other transistors T2, T4 are connected to ground potential. The emitters of the transistors T1, T2 and T3, T4, respectively, are coupled with each other internally in the integrated circuit component J1 and are further connected to a negative operational voltage $-U_b = -5\,V$ by way of respective emitter resistors R3 and R4.

A second integrated circuit component J2 is designed as a double difference comparing device and is utilized as a threshold circuit and as a logical linkage of the two parallel connected control signal generators on the output side of the circuit. The component J2 comprises two independent input amplifiers V1 and V2. The output of each of these input amplifiers is respectively connected with an input of two additional AND gates UG3, UG4 whose second inputs are also connected to the positive operating voltage $+U_b = 5\,V$. The outputs of the input amplifiers V1 and V2 are connected with the inputs of and OR gate OG by way of the AND gates UG3 and UG4, respectively. The OR gate OG has an output A where the signal output of the two parallel connected control signal generators is formed.

The mode of operation of the circuit arrangement is as follows. With a corresponding signal assignment at the inputs E0, E1 and E2, a high logical ECL potential will be applied to the negated output of the first AND gate UG1. Therefore, the transistor T1 which is connected to that output is rendered conductive and the RC circuit R1, C1 is charged with a constant current which can be adjusted by way of the emitter resistor R3 of the emitter coupled pair of transistors T1, T2. The voltage and the collector of the transistor T1 therefore moves towards negative values.

The input amplifier V1, which is connected to the collector of the transistor T1 and which also has this collector potential at its negative input experiences the potential changes at the collector of the transistor T1. The positive input of the amplifier is maintained at ground potential. As soon as the potential applied to the negative input of the amplifier V1 becomes lower than the ground potential provided at the positive input of the amplifier V1, the amplifier V1 will emit a sufficiently high voltage to cause the AND gate UG3 connected thereto to switch through so that an output signal corresponding to the high level logic voltage of TTL circuit techniques to occur at the output A of the component J1 by way of the OR gate OG. Due to the symmetrical construction of the two integrated components, a corresponding function will occur for the second control signal generator upon the application of similar potentials to the inputs EO, E3 and E4 of the first integrated circuit component J1.

From the foregoing it is readily appreciated that when a combination of input signal controls or triggers the internal transistor T1 or the internal transistor T2 of the integrated circuit component J1 for a duration which is longer than the time interval provided by the respective timing circuits R1, C1 and R2, C2 in combination with the respective resistors R3, R4, a control signal of a high logic voltage level utilized by TTL circuits will be produced at the output A. The RC circuits R1, C1 and R2, C2, respectively, will discharge in accordance with their time constants when the respective transistor T1, T3 is rendered nonconductive due to a change of state of its associated AND gate UG1, UG2, and therefore the other transistor T2, T4, respectively, necessarily becomes conductive.

It is particularly advantageous with the above described circuit arrangement that two parallel connected control signal generators can be constructed of only two integrated circuit components which are common on the market and few discrete component elements wherein the circuits are already logically linked in the second integrated circuit component that functions as a double difference comparing device. A further logical linkage of the output signals of other control signal generators, which is dependent on the type of assignment of the control device to the selection matrix can therefore be realized with little expense.

It is particularly inexpensive to control the control signal generators by way of the first two AND gates of the first integrated circuit component J1 since these circuits have several inputs and can be utilized not only as threshold circuits but also as a decoding stage. Therefore, external decoding networks required for controlling the control signal generators can be much more simply constructed.

Although I have described my invention by reference to a specific illustrative embodiment thereof, many changes and modifications may become apparent to those skilled in the art without departing from the spirit and scope of my invention and it is to be understood that I intend to include within the patent warranted hereon all such changes and modifications as may reasonably and properly be included within the scope of my contribution to the art.

I claim:

1. A control device for a selection matrix of a data memory having selective access, comprising: a first circuit potential converter including two parallel connected control signal generators each comprising first and second transistors, each of said transistors having a base, an emitter and a collector, said emitters connected together, a pair of discrete component first resistors, said commonly connected emitters connected to respective ones of said first resistors and by said first resistors to a first operating potential, a pair of RC circuits connected between said collectors of respective ones of said first transistors to a second operating potential, said collectors of said second transistors connected to a reference potential, a pair of first AND gates each having a plurality of inputs and complementary outputs, said bases of said first and second transistors of one of said control signal generators connected to respective complementary outputs of one of said first AND gates and said bases of said first ands second transistors of the other said control signal generator connected to respective complementary outputs of the other of said first AND gates, one input of each of said first AND gates connected to the like input of the other first AND gate for receiving an input signal whose duration corresponds to the operational state of a selection circuit being monitored, the other inputs of said first AND gates performing a decoding function for operational selection of said control signal generators; and a second circuit double difference comparing stage including a pair of amplifiers each having an output, a first input connected to a reference potential, and a second input connected to a collector of respective ones of said first transistors, a pair of second AND gates each having an output, a first input connected to the second operating potential, and a second input connected to the output of a respective one of said amplifiers, and an OR gate having a pair of inputs connected to respective ones of said outputs of said second AND gates, and an output for providing the control signal from the respective operating one of said control signal generators when the duration of the input signal on the commonly connected inputs of said first AND gates causes conduction of the corresponding first transistor for a time sufficient for the associated RC circuit to simulate the operational condition of the monitored circuit and change the potential at the second input of the associated amplifier sufficiently for the amplifier to operate and open the associated second AND gate and said OR gate.

* * * * *